United States Patent [19]
Fukushima et al.

[11] Patent Number: 4,900,056
[45] Date of Patent: Feb. 13, 1990

[54] HYDRAULIC CYLINDER ASSEMBLY FOR AUTOMOTIVE SUSPENSION SYSTEM AND ACTIVELY CONTROLLED SUSPENSION SYSTEM UTILIZING SAME

[75] Inventors: Naoto Fukushima, Kamakura; Yukio Fukunaga, Zushi; Yosuke Akatsu; Sunao Hano, both of Yokohama; Masaharu Sato, Kanagawa, all of Japan

[73] Assignee: Nissan Motor Company, Limited, Yokohama, Japan

[21] Appl. No.: 199,347

[22] Filed: May 26, 1988

[30] Foreign Application Priority Data

May 29, 1987 [JP] Japan .................................. 62-134497

[51] Int. Cl.$^4$ ............................................. B60G 11/26
[52] U.S. Cl. .................................... 280/708; 280/707; 280/714
[58] Field of Search ......................... 280/708, 707, 714

[56] References Cited

U.S. PATENT DOCUMENTS

| | | | |
|---|---|---|---|
| 3,077,345 | 2/1963 | Andersson et al. | 280/708 |
| 4,159,106 | 6/1979 | Nyman | 280/708 |
| 4,445,672 | 5/1984 | Turiot | 280/708 |
| 4,478,431 | 10/1984 | Muller et al. | 280/708 |
| 4,702,490 | 10/1987 | Yamaguchi et al. | 280/707 |

FOREIGN PATENT DOCUMENTS 0249209  12/1987  European Pat. Off. .

Primary Examiner—Kenneth R. Rice
Attorney, Agent, or Firm—Foley & Lardner, Schwartz, Jeffery, Schwaab, Mack, Blumenthal & Evans

[57] ABSTRACT

A hydraulic cylinder assembly to be used in an actively controlled suspension system includes a built-in pressure accumulator. The pressure accumulator employed in the hydraulic cylinder assembly has a reciprocally movable free piston for dividing a fluid chamber and a pneumatic chamber. The free piston thrustingly moves for establishing pressure balance between the fluid chamber and the pneumatic chamber and, in turn, for establishing pressure balance between the fluid chamber and an associated pressure chamber in the hydraulic cylinder so as to accumulate pressure while the fluid in the associated pressure chamber is compressed and to supply the pressure when the associated pressure chamber expands while absorbing vibration energy exerted between a vehicle body and a suspension member.

29 Claims, 4 Drawing Sheets

HYDRAULIC CYLINDER ASSEMBLY FOR AUTOMOTIVE SUSPENSION SYSTEM AND ACTIVELY CONTROLLED SUSPENSION SYSTEM UTILIZING SAME

BACKGROUND OF THE INVENTION

1. Field of the Invention

The present invention relates generally to a hydraulic cylinder assembly for an automotive suspension system for controlling suspension characteristics depending upon vehicle driving condition. More specifically, the invention relates to an actively controlled suspension system with a hydraulic cylinder assembly.

2. Description of the Background Art

In the recent years, actively controlled suspension systems have been developed and proposed. Such an actively controlled system includes a hydraulic cylinder assembly interposed between a vehicle body and a suspension member which rotatably support a vehicular wheel. The hydraulic cylinder assembly is connected to a working fluid pressure source via a hydraulic circuit. For example, such an actively controlled suspension system has been disclosed in the U.S. Pat. No. 4,702,490, issued on Oct. 27, 1987.

In such actively controlled suspension systems, there is a proposal for improving suspension control characteristics and response characteristics. Such improvement has been disclosed in the European Patent First (unexamined) Publication No. 02 49 209. In the disclosed system, a pressure accumulator is connected to the hydraulic cylinder assembly for accumulating excessive hydraulic pressure and supplying hydraulic pressure to the hydraulic cylinder. Since the accumulator is directly in communication with a pressure chamber of the hydraulic cylinder, it will provide capacity for the hydraulic cylinder to absorb road shock by adjusting hydraulic pressure and to provide sufficiently high response characteristics by quick supply and quick drain of pressurized fluid.

The pressure accumulator, proposed in the aforementioned European Patent First Publication No. 02 49 209, a pneumatic pressure chamber and a hydraulic pressure chamber separated by an elastic diaphragm member is included. The diaphragm member is made of rubber. When such a rubber diaphragm is subjected to high temperature, leakage of gas in the pneumatic pressure chamber tends to occur to lower pressure accumulation capacity. Furthermore, since such a rubber diaphragm is frequently subject to pressure variation caused due to road shock, secular variation in the diaphragm tends to occur in a relatively short period.

SUMMARY OF THE INVENTION

Therefore, it is a principle object of the present invention to provide a hydraulic cylinder assembly which is satisfactorily durable and will not cause gas leakage even at high temperature.

Another object of the invention is to provide a hydraulic cylinder assembly which does not require a pressure accumulator to provide satisfactory shock absorbing effect and response characteristics.

In order to accomplish the aforementioned and other objects, a hydraulic cylinder assembly to be used in an actively controller suspension system, according to the present invention, includes a built-in pressure accumulator. The pressure accumulator employed in the hydraulic cylinder assembly has a reciprocally movable free piston for dividing a fluid chamber and a pneumatic chamber.

In the preferred construction, the pressure accumulator has a greater effective cross-sectional area than that of a hydraulic cylinder active for adjusting suspension characteristics.

According to one aspect of the invention, a hydraulic cylinder assembly for damping relative displacement of relatively movable first and second members, comprises a cylinder housing defining an internal space filled with a working fluid and connected to the first member, a piston disposed within the internal space of the cylinder housing and dividing the internal space into first and second fluid chambers, the piston being connected to the second member via a piston rod extending from the cylinder housing, a pressure accumulating means having a cylindrical body connected to the cylinder housing, the cylindrical body defining an internal space in communication with the second fluid chamber via a flow restricting fluid path, and a free piston assembly disposed within the internal space of the cylindrical body for dividing the internal space into a third fluid chamber and a pneumatic chamber, the third fluid chamber being in communication with the second fluid chamber via the flow restricting fluid path, the free piston assembly being movable depending upon the pressure difference between the third fluid chamber and the pneumatic chamber, for receiving pressurized fluid in the lower fluid chamber when the fluid pressure in the second fluid chamber is higher than that in the third fluid chamber for accumulating pressure and supplying pressure to the second fluid chamber when the fluid pressure in the second fluid chamber is lower than that in the third fluid chamber.

According to another aspect of the invention, a hydraulic cylinder assembly for an automotive suspension system for absorbing relative movement between a vehicle body and a suspension member rotatably mounting a vehicular wheel, comprises a cylinder housing defining an internal space filled with a working fluid and connected to one of the vehicular body and the suspension member, a piston disposed within the internal space of the cylinder housing and dividing the internal space into first and second fluid chambers, the piston being connected to the other of the vehicle body and the suspension member via a piston rod extending from the cylinder housing, a pressure accumulating means having a cylindrical body connected to the cylinder housing, the cylindrical body defining an internal space in communication with the second fluid chamber via a flow restricting fluid path, and a free piston assembly disposed within the internal space of the cylindrical body for dividing the internal space into a third fluid chamber and a pneumatic chamber, the third fluid chamber being in communication with the second fluid chamber via the flow restricting fluid path, the free piston assembly being movable depending upon pressure difference between the third fluid chamber and the pneumatic chamber, for receiving pressurized fluid in the lower fluid chamber when the fluid pressure in the second fluid chamber is higher than that in the third fluid chamber, for accumulating pressure and supplying pressure to the second fluid chamber when the fluid pressure in the second fluid chamber is lower than that in the third fluid chamber.

According to a further aspect of the invention, an actively controlled suspension system for an automotive suspension system, comprises a hydraulic cylinder assembly disposed between a vehicle body and a suspension member rotatably supporting a vehicular wheel, which comprises a cylinder housing defining an internal space filled with a working fluid and connected to one of the vehicular body and the suspension member, a piston disposed within the internal space of the cylinder housing and dividing the internal space into first and second fluid chambers, the piston being connected to the other of the vehicle body and the suspension member via a piston rod extending from the cylinder housing, a pressure accumulating means having a cylindrical body connected to the cylinder housing, the cylindrical body defining an internal space in communication with the second fluid chamber via a flow restricting fluid path, and a free piston assembly disposed within the internal space of the cylindrical body for dividing the internal space into a third fluid chamber and a pneumatic chamber, the third fluid chamber being in communication with the second fluid chamber via the flow restricting fluid path, the free piston assembly being movable depending upon pressure difference between the third fluid chamber and the pneumatic chamber for receiving pressurized fluid in the lower fluid chamber when the fluid pressure in the second fluid chamber is higher than that in the third fluid chamber for accumulating pressure and supplying pressure to the second fluid chamber when the fluid pressure in the second fluid chamber is lower than that in the third fluid chamber; and a hydraulic means associated with the first chamber of the hydraulic cylinder for adjusting the fluid pressure in the first chamber, for controlling attitude of the vehicle, the hydraulic means including a pressure source and a pressure control valve which is electrically controlled for introducing pressurized working fluid into the first chamber and draining the working fluid in the first chamber depending upon the vehicle driving condition.

Preferably, the pressure control valve comprises a valve housing defining a valve bore, an inlet port connected to the pressure source means via a supply line of the hydraulic circuit means, a drain port connected to the pressure source means via a drain line of the hydraulic circuit means and an outlet port connected to the first chamber of the hydraulic cylinder, a valve member disposed within the valve bore for thrusting movement therein for selectively establishing communication between the outlet port and the inlet port and between the outlet port and the drain port for controlling fluid pressure in the first chamber, and an electrically operable actuator associated with the valve member for driving the latter to control the valve position according to the vehicle driving condition.

The free piston assembly has a diameter greater than that of the piston in the cylinder housing for avoiding influence of friction between the outer periphery of the free piston and the inner periphery of the cylindrical body.

The piston in the cylinder housing has a flow restrictive communication path for establishing fluid communication between the first and second fluid chambers. The communication path includes a flow restricting means which varies flow restriction magnitude depending upon the flow direction of the working fluid. The flow restricting means applies greater magnitude of flow restriction for the fluid flow caused by relative motion of the vehicle body and the suspension member in rebounding direction than the fluid flow created by bounding action. On the other hand, the fluid path includes a flow restricting means which varies flow restriction magnitude depending upon the flow direction of the working fluid. The flow restricting means applies greater magnitude of flow restriction for the fluid flow caused by relative motion of the vehicle body and the suspension member in bounding direction than the fluid flow created by rebounding action.

DESCRIPTION OF THE PREFERRED EMBODIMENT

Figure 1:
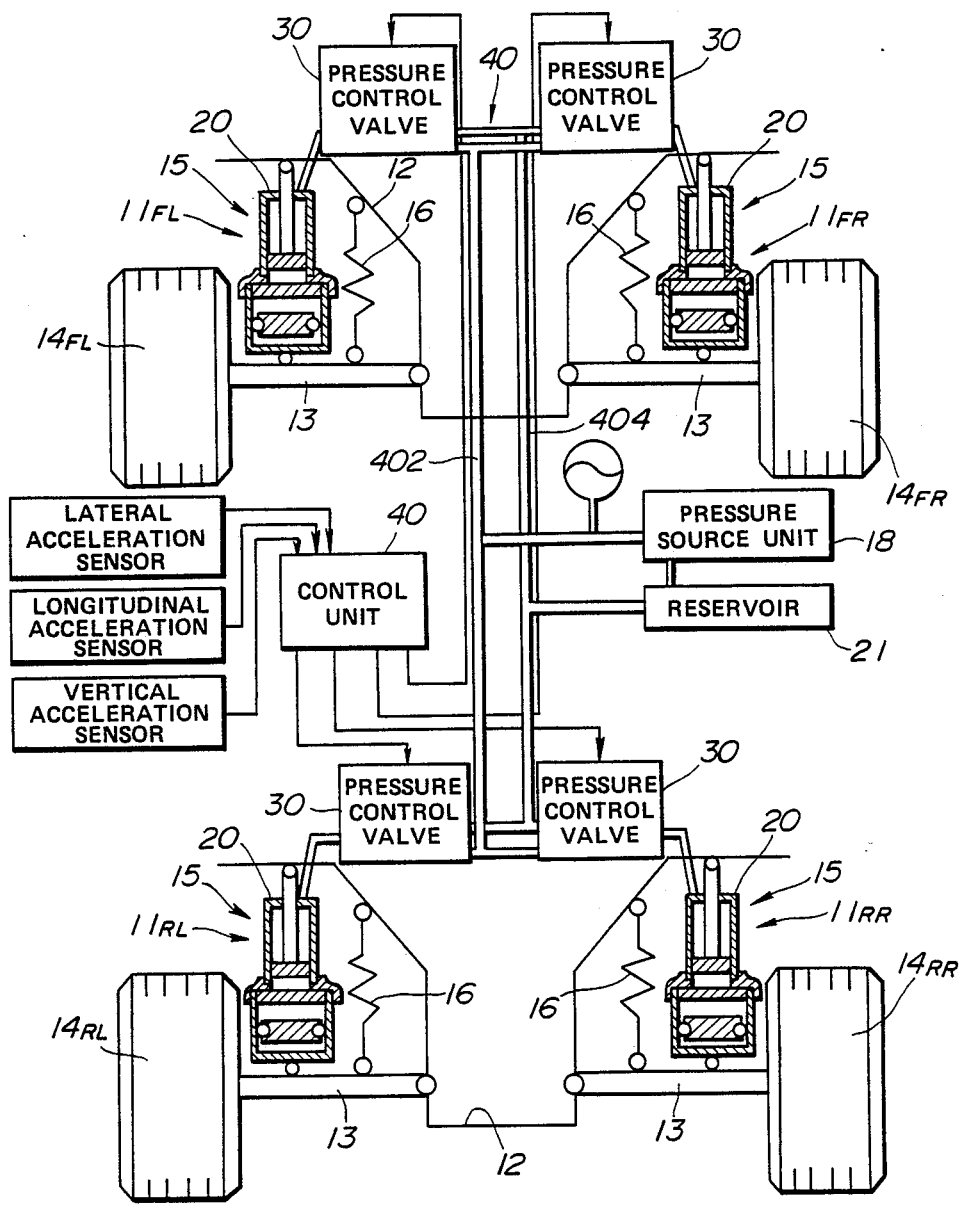
FIG. 1 is a diagramatical illustration of the preferred embodiment of an actively controlled suspension system according to the invention, the actively controlled suspension system includes the preferred embodiment of a hydraulic cylinder assembly of the invention.

Referring now to the drawing, particularly to FIG. 1, a vehicle has four suspension systems 11FL, 11FR, 11RL and 11RR for respectively suspending vehicle body 12 on front-left, front-right, rear-left and rear-right road wheels 14FL, 14FR, 14RL and 14RR. Each of the front-left, front-right, rear-left and rear-right suspension systems 11FL, 11FR, 11RL and 11RR comprises a suspension member 13, such as a suspension link, a suspension arm and so forth, and a suspension assembly 15 which is interposed between the vehicle body 12 and the suspension member 13. The suspension assembly 15 has a hydraulic cylinder 20 which serves as an actuator for generating damping force against bounding and rebounding motion between the vehicle body and the suspension member, and a coil spring 16.

It should be appreciated that, in the shown embodiment, the coil spring 16 is not necessary to damp dynamic kinetic energy and should resiliently support only static load to be exerted between the vehicle body and the suspension member. However, it should be, of course, possible to employ the coil spring which can be strong enough to damp part of dynamic kinetic energy in relative bounding and rebounding motion of the vehicle body and the suspension member.

The hydraulic cylinder 20 of the suspension assembly 15 is connected to a hydraulic pressure source unit 18 via a hydraulic circuit 40 which includes pressure control valves 30. Each of the pressure control valve 30 is electrically operable and connected to a microprocessor-based control unit 50. The hydraulic circuit 40 includes a supply line 402 and a drain line 404. The pressure source unit generally comprises a pressure unit 18 and a reservoir tank 21. The pressure unit 18 is connected to the reservoir tank 21 to suck the viscous working fluid in the reservoir tank 21 to feed to the pressure control valve 30 via the supply line 402. On the other hand, the drain line 404 is connected to the reservoir 21 to return the working fluid thereto.

The control unit 50 is generally perform attitude change suppressive suspension control, such as anti-pitching, anti-rolling and anti-bouncing suspension control, based on various preselected suspension control parameters. In the shown embodiment, the control unit 50 is connected to a lateral acceleration sensor 502, a longitudinal acceleration sensor 504 and a vertical acceleration sensor 506. The lateral acceleration sensor 502 monitors lateral acceleration of the vehicular body 12 to produce a vehicular rolling magnitude indicative signal. Similarly, the longitudinal acceleration sensor 504 monitors longitudinal acceleration to be exerted on the vehicular body 12 to produce a vehicular pitching magnitude indicative signal. The vertical acceleration sensor 506 monitors the vertical acceleration of the vehicular body 12 in bounding and rebounding motion.

Practical suspension controls to be performed by the control unit 50 in the preferred embodiment of the actively controlled suspension system, have been disclosed in the following co-pending U.S. patent applications:

U.S. patent application Ser. No. 052,934, filed on May 22, 1987;
U.S. patent application Ser. No. 024,209, filed on June 10, 1987;
U.S. patent application Ser. No. 060,856, filed on June 12, 1987;
U.S. patent application Ser. No. 060,911, filed on June 12, 1987
U.S. patent application Ser. No. 061,368, filed on June 15, 1987;
U.S. patent application Ser. No. 069,909 filed on June 17, 1987.

The disclosures of the above-identified co-pending U.S. patent applications are herein incorporated by reference.

Figure 2:
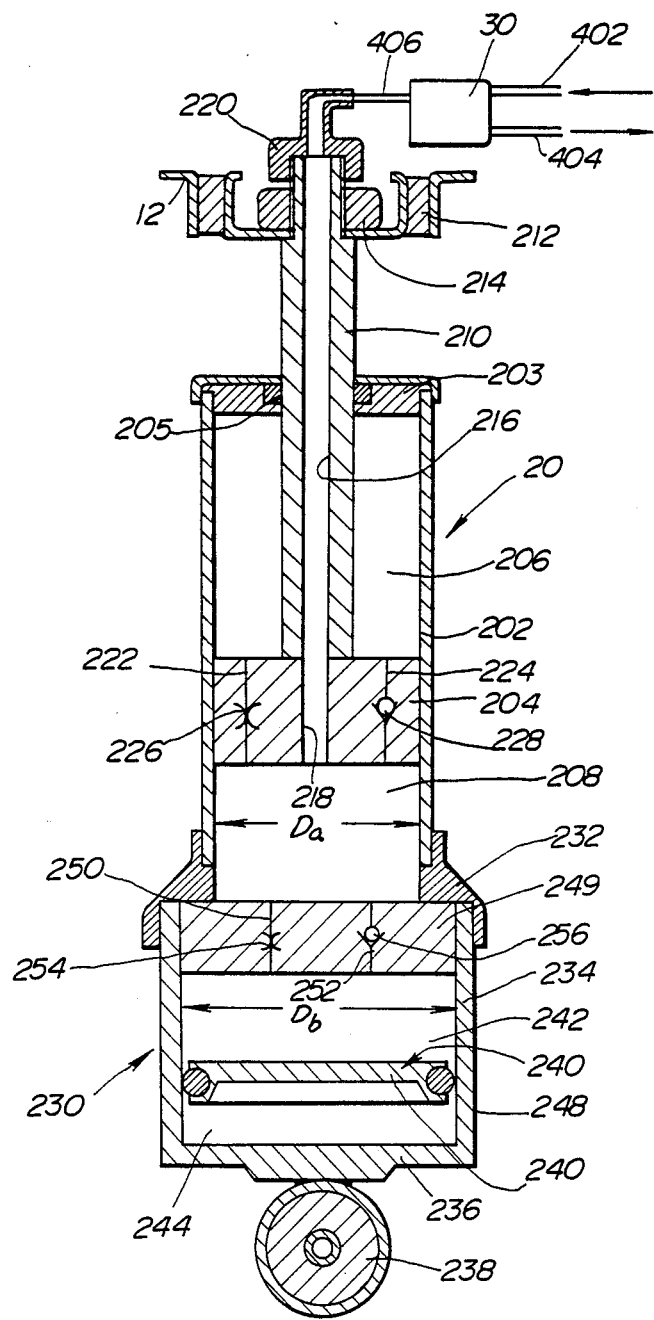
FIG. 2 is an enlarged section of the hydraulic cylinder assembly in the actively controlled suspension system of FIG. 1.

FIG. 2 shows the detailed construction of the preferred embodiment of the hydraulic cylinder 20 which is employed in the preferred embodiment of the actively controlled suspension system of FIG. 1. The hydraulic cylinder 20 has a hollow cylinder housing 202 filled with a viscous working fluid. The cylinder housing 202 is of generally top end and bottom end opened construction. The top end of the cylinder housing is closed by a closure cap 203 with an elastic seal ring 205. A pressure accumulator assembly 230 is fixed to the lower end of the cylinder housing 202 by means of a tapered connector tube 232, to define the essentially enclosed internal space in the cylinder housing.

A piston 204 sealingly and thrustingly disposed within the internal space of the cylinder housing to divide the cylinder space into upper and lower fluid chambers 206 and 208. A piston rod 210 extends through the upper end of the cylinder housing 202 and connected to the vehicular body 12 via a vibration damper 212 made of elastic material, such as rubber, by means of a fastening nut 214. The lower end of the pressure accumulator assembly 230 is connected to the suspension member 13.

The piston rod 210 is formed with an axially extending through opening 216. The through opening 216 opens to outside of the cylinder housing 202 at the upper end. The lower end of the through opening 218 is communicated with an axially extending center opening 216 which opens to the lower fluid chamber 208 at the lower end. A coupler 220 is engaged to the top end of the piston rod 210 to establish communication between the lower fluid chamber 208 and the pressure control valve 30 via a pressure line 406.

The piston 204 is axially extending communication paths 222 and 224 formed therethrough for establishing fluid communication between the upper and lower fluid chambers 206 and 208. The communication paths 222 and 224 are oriented in radially offset and essentially and radially symmetrical positions. An orifice 226 is provided in the communication path 222 for restricting fluid flow. On the other hand, an one-way check valve 228 which permits fluid flow from the lower fluid chamber 208 to the upper fluid chamber 206 and blocks opposite direction of fluid flow.

The pressure accumulator assembly 230 comprises an essentially cylindrical accumulator body 234. The accumulator body 234 has a bottom 236 connected to the suspension member 13 via a rubber bushing 238. A free piston assembly 240 is disposed within the internal space of the accumulator body 234 to define there within an upper fluid chamber 242 and a lower pneumatic chamber 244. The free piston assembly generally comprises an essentially disc-shaped piston body 246 and an elastic sealing ring 248. The elastic sealing ring 248 tightly but slidingly contact with the inner periphery of the accumulator body 234 for establishing liquid tight and gas tight seal therebetween.

An upper wall 249 of the accumulator body 234 is formed with axially extending through openings 250 and 252 to establish fluid communication between the lower fluid chamber 208 of the hydraulic cylinder 20 and the fluid chamber 242 of the pressure accumulator assembly 230. An orifice 254 is provided in the through opening 250 to restrict fluid flow therethrough. On the other hand, an one-way check valve 256 is provided to the through opening 252 to permit fluid flow from the fluid chamber 242 of the pressure accumulator assembly 230 to the lower fluid chamber 208 of the hydraulic cylinder 20 and to block fluid flow in opposite direction.

As seen from FIG. 2, the accumulator body 234 has greater internal diameter Db than that Da of the cylinder housing 202. Therefore, the outer diameter of the free piston assembly 240 which corresponds to the internal diameter Db of the accumulator body 234, is greater than the outer diameter of the piston 204 which corresponds to the internal diameter Da of the cylinder housing 202.

In the construction set forth above, the pressurized fluid fed from the pressure control valve 30 is introduced into the lower fluid chamber 208. Since the lower fluid chamber 208 is in communication with the upper fluid chamber 206 via the through opening 222 with the orifice 226 and with the fluid chamber 242 of the pressure accumulator assembly 230 via the through opening 250 with the orifice 254, fluid pressures in the upper and lower fluid chambers 206 and 208 and the fluid chamber 242 balances while the vehicular attitude is held in stable condition. Since the free piston assembly 240 is designed to move freely, the pressure in the pneumatic chamber 244 also balances to the fluid pressure in the fluid chamber 242.

The one-way check valves 228 is provided for blocking fluid flow from the upper fluid chamber 206 to the lower fluid chamber 208 as set forth above. This differential working fluid flow rate of the working fluid depends upon the working fluid flow direction. Namely, when the working fluid flows from the lower fluid chamber 208 to the upper fluid chamber 206, the working fluid flow rate is greater than that of the fluid flow from the upper fluid chamber to the lower fluid chamber. Similarly, the one-way check valves 256 is provided for blocking fluid flow from the lower fluid chamber 208 to the fluid chamber 242 of the pressure accumulator 230 as set forth above. This differential working fluid flow rate of the working fluid depends upon the working fluid flow direction. Namely, when the working fluid flows from the fluid chamber 242 to the lower fluid chamber 208, the working fluid flow rate is greater than that of the fluid flow in the opposite direction. These one-way check valves 228 and 256 serve for providing hysteresis in variation of the fluid pressure for preventing hunting.

Figure 3:
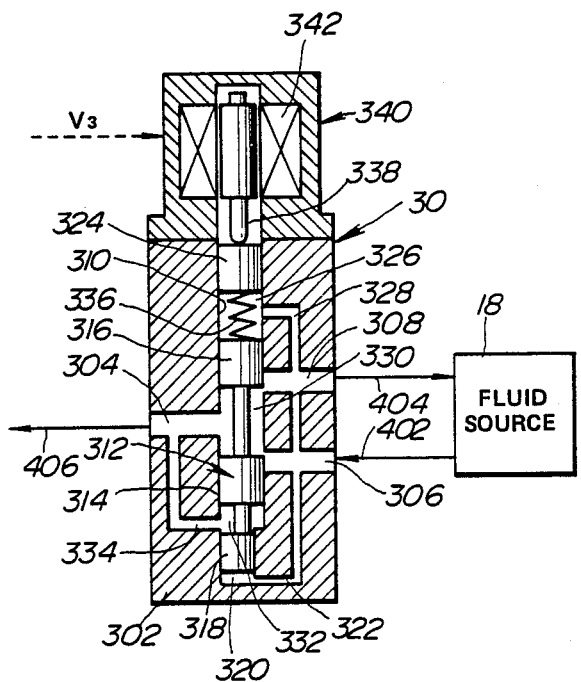
FIG. 3 is a section of a pressure control valve assembly employed in the actively controlled suspension system of FIG. 1.

FIG. 3 shows the detailed construction of the pressure control valve 30 which can be employed in the preferred embodiment of the actively controlled suspension system of the invention. The pressure control valve 30 has a valve housing 302 having an outlet port 304, an inlet port 306 and a drain port 308. Respective inlet port 306, the drain port 308 and the outlet port 304 are connected to a valve bore 310 defined within the valve housing 302. A valve spool 312 is disposed within the valve bore 310 for thrusting movement therein. The valve spool 312 has first, second and third lands 314, 316 and 318. As will be seen from FIG. 3, the third land 318 has smaller diameter than that of the first and second lands 314 and 316. The third land 318 defines a fifth pressure control chamber 320 which is connected to the drain port 308 via a drain path 322. An actuator piston 324 is also disposed within the valve bore 310. The actuator piston 324 opposes the second land 316 in spaced apart relationship to define a second pressure control chamber 326 which is connected to the drain port 308 via a drain path 328. An annular pressure chamber 330 is defined between the first and second lands 314 and 316. The pressure chamber 330 is constantly communicated with the outlet port 304 and thereby communicated with the lower fluid chamber 208 of the hydraulic cylinder 20. On the other hand, the pressure chamber 330 shifts according to shifting of the valve spool 312 to selectively communicate with the inlet port 306 and the drain port 308. On the other hand, an pressure control chamber 332 is defined between the first and third lands 314 and 318. The pressure control chamber 332 is in communication with the outlet port 304 via a pilot path 334. A bias spring 336 is interposed between the actuator piston 324 and the valve spool 312. The actuator piston 324 contacts with an actuator rod 338 of an electrically operable actuator 340 which comprises an electromagnetic solenoid. The solenoid 340 comprises a proportioning solenoid.

In order to increase the supply pressure of the working fluid, the spool valve 312 is shifted to the downwardly shifted position to increase path area at a throttle constituted at the inner end of the inlet port 306 by means of the land 314 of the spool valve 312. On the other hand, in order to decrease the supply pressure of the working fluid, the spool valve is shifted to the upwardly shifted position to decrease the path area at the throttle of the inner end of the inlet port 306 and opens the drain port 308 which is normally blocked by means of the land 316 of the spool valve.

Construction of the pressure control valves is not limited to the construction illustrated in FIG. 3 but can be replaced with any appropriate constructions. For example, the pressure control valve constructions as illustrated in European Patent First Publication 01 93 124, set forth above, can also be employed. The disclosure of the aforementioned European Patent First Publication 01 93 124 is herein incorporated by reference for the sake of disclosure.

Figure 4:
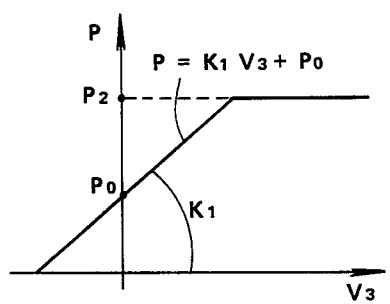
FIG. 4 is a graph showing variation of hydraulic pressure supplied from the pressure control valve assembly to a pressure chamber in the hydraulic cylinder assembly.

As seen from FIG. 3, the proportioning solenoid 340 comprises the actuator rod 338 and a solenoid coil 342. The solenoid coil 342 is energized by suspension control signal $V_3$ from the control unit 50. In the shown embodiment of the pressure control valve, the working fluid pressure P at the outlet port 304 is variable according to the characteristics shown in FIG. 4. Namely, when the control valve $V_3$ as represented by the suspension control signal is zero, the pressure P at the outlet port 30 becomes $P_0$ determined according to a predetermined offset pressure $P_0$. When the suspension control signal value in positive value increases, the fluid pressure P at the outlet port 304 increases with a predetermined proportioning gain $K_1$. Namely, by increasing of the suspension control value $V_3$, the actuator rod 338 is driven downwardly in FIG. 3 at a magnitude toward to the downwardly shifted position to achieve increasing of the fluid pressure with the predetermined proportioning gain $K_1$. The fluid pressure P at the outlet port 304 saturate at the output pressure $P_2$ of the pressure unit 18. On the other hand, when the suspension control signal value $V_3$ decreases, the pressure P decreases to zero to by shifting of the actuator rod 338 toward the upwardly shifted direction.

The actuator rod 338 of the proportioning solenoid 340 is associated with the actuator piston 324. Contact between the actuation rod 338 and the actuator piston 324 can be maintained by the resilient force of the bias spring 336 which normally biases the actuator piston toward the actuation rod. On the other hand, the spring force of the bias spring 336 is also exerted on the valve spool 312 to constantly bias the valve spool downwardly in FIG. 3. The valve spool 312 also receives upward hydraulic force from the pressure control chamber 332. Therefore, the valve spool 312 is oriented at the position in the valve bore at the position where the downward bias of the bias spring 336 balances with the upward hydraulic force of the pressure control chamber 332.

When bounding motion occurs at the suspension member, the piston 204 of the hydraulic cylinder 20 shifts downwardly to cause decreasing of the fluid pressure in the upper fluid chamber 206 and increasing of the fluid pressure in the lower fluid chamber 208. Then, the working fluid in the lower fluid chamber 208 flows through the through opening 222 and orifice 226 and the through opening 224 and the check valve 228. At the same time, the increasing of the fluid pressure in the lower fluid chamber destroys pressure balance between the lower fluid chamber 208 and the fluid chamber 242. As a result, the working fluid in the lower fluid chamber 208 flows into the fluid chamber 242 of the pressure accumulator assembly 230 via the through openings 250 and orifice 254. Since the fluid flow path area for the fluid flow from the lower fluid chamber 208 to the upper fluid chamber 206 is greater than that of the fluid flow from the lower fluid chamber 208 to the fluid chamber 242. As a result, the fluid pressure in the upper fluid chamber 206 is increased to balance with the pressure in the lower fluid chamber 208. This allows absorption of the bounding energy.

During the bounding energy absorbing action set forth above, the fluid pressure in the fluid chamber 242 pressure accumulating increases to cause downward shift of the free piston assembly 240 to accumulate the pressure.

During bounding damping action set forth above, the pressure control valve 30 is also active for absorbing the rebounding energy. Namely, according to increasing of the fluid pressure in the lower fluid chamber, the fluid pressure at the outlet port 304 of the pressure control valve 30 increases. As a result, the fluid pressure in the pressure control chamber 332 increases by the pressure introduced through the pilot path 334 to destroy the balance between the downward bias of the bias spring 336 and the upward hydraulic force of the pressure control chamber 332. This causes upward movement of the valve spool 312 against the spring force of the bias spring 336. As a result, path area of the drain port 308 increases and the inlet port 306 becomes blocked. Therefore, the fluid pressure in the lower fluid chamber 208 is decreased by draining the pressurized fluid there through. Therefore, the increased fluid pressure in the lower fluid chamber 208 of the hydraulic cylinder 20 can be successfully absorbed so that the bounding energy input from the suspension member will not be transmitted to the vehicle body.

When rebounding motion occurs at the suspension member, the piston 204 of the hydraulic cylinder 20 shifts upwardly relative to the cylinder housing 202 to cause increasing of the fluid pressure in the upper fluid chamber 206 and decreasing fluid pressure in the lower fluid chamber 208. Then, the working fluid in the upper fluid chamber 206 flows through the through opening 222 and orifice 226. At the same time, the decreasing of the fluid pressure in the lower fluid chamber destroys pressure balance between the lower fluid chamber 208 and the fluid chamber 242. As a result, the working fluid in the fluid chamber 242 flows into the lower fluid chamber 208 via the through openings 250 and 252. The fluid flow path area for the fluid flow from the fluid chamber 242 of the pressure accumulator assembly 230 is greater than that of the fluid flow from the upper fluid chamber 206 to the lower fluid chamber. This allows absorption of the rebounding energy. Furthermore, quicker increase of the fluid pressure in the lower fluid chamber 208 prevents the pressure in the upper fluid chamber from dropping and thus creates resistance against upward movement of the piston 204 to absorb upward motion energy exerted on the piston and thus reduces the magnitude of relative rebounding motion between the vehicle body and the vehicular wheel.

When the magnitude of the rebounding motion is significant, the fluid pressure in the fluid chamber 242 is decreased, the free piston moves upwardly to decrease the pneumatic pressure in the pneumatic chamber 244.

During rebounding damping action set forth above, the pressure control valve 30 is also active for absorbing the rebounding energy. Namely, according to decreasing of the fluid pressure in the lower fluid chamber, the fluid pressure at the outlet port 304 of the pressure control valve 20 decreases. As a result, the fluid pressure in the pressure control chamber 332 decreases by the pressure introduced through the pilot path 334 to destroy the balance between the downward bias of the bias spring 336 and the upward hydraulic force of the pressure control chamber 332. This causes downward movement of the valve spool 312 against the spring force of the bias spring 336. As a result, the path area of the inlet port 306 increases and the drain port 308 becomes blocked. Therefore, the fluid pressure is introduced into in the lower fluid chamber 208. The pressurized fluid introduced from the pressure control valve 30 to the lower fluid chamber 208, is cooperative with the fluid pressure introduced from the fluid chamber 242 of the pressure accumulator assembly 230 to successfully absorb the rebounding energy.

By the bounding and rebounding energy absorbing action, satisfactory suspension control can be performed for absorbing high frequency shock which may degrade riding comfort. On the other hand, when the magnitude of relative displacement is substantial and frequency of vibration is low, the control unit 50 becomes active for performing attitude change suppressive suspension control, such as anti-rolling, anti-pitching, anti-bouncing and so forth. Practical anti-rolling, anti-pitching, anti-bouncing suspension control operations to be performed by the control unit 50 have been disclosed in the co-pending U. S. patent applications listed above.

Here, the diameter Db of the free piston assembly 240 is advantageously differentiated from that of the piston 204 for satisfactorily avoiding influence of friction between the sealing ring 248 and the inner periphery of the accumulator body 234. Namely, assuming that the friction between the sealing ring 248 of the free piston assembly 240 and the inner periphery of the accumulator body 234 is Qb and the friction between the outer periphery of the piston 204 and the inner periphery of the cylinder housing 202 is Qa, the pressure $\Delta P$ required for thrustingly driving the free piston assembly 240 can be illustrated by the following equation:

$$Qb = \Delta P \times \pi/4 \times Db^2 \quad (1)$$

The magnitude of friction Qb is proportional to the circumferential length of free piston assembly 240. Therefore, it can be illustrated by the following equation:

$$Qb = K \times \pi \times Db \quad (2)$$

where K is a constant determined by a friction coefficients of the seal ring 248 and the inner periphery of the accumulator body 234.

On the other hand, the friction Qa can be illustrated in relation to the fluid pressure $\Delta P$ by the following equation:

$$Qa = P \times \pi/4 \times Da^2 \quad (3)$$

From the equations (1) to (3), the following equation can be established:

$$\begin{aligned} Qa &= K \times \pi \times (Da^2/Db) \\ &= (K \times \pi \times Da) \times (Da/Db) \end{aligned} \quad (4)$$

As will be seen from the foregoing equation (4), greater diameter Db of the free piston assembly 240 decreases equivalent friction Qa.

Therefore, as will be appreciated, greater diameter of free piston assembly may successfully avoid influence of the friction between the free piston and mating inner periphery of the accumulator body.

Figure 5:
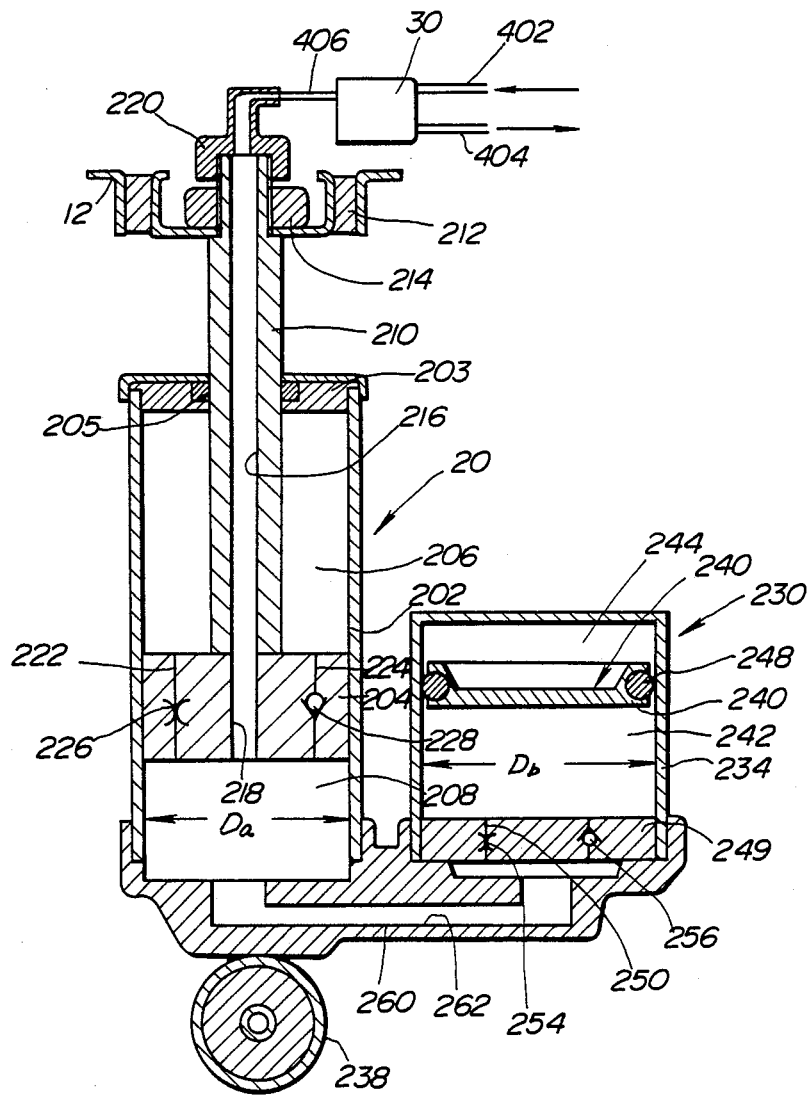
FIG. 5 is a section of a modification of the preferred embodiment of a hydraulic cylinder assembly of FIG. 2.

FIG. 5 shows another embodiment of the hydraulic cylinder assembly to be employed in the preferred embodiment of the actively controlled suspension system according to the invention. In this embodiment, a particular difference to the former embodiment is the parallel arrangement of the pressure accumulator assembly 240. The components of the hydraulic cylinder common to the former embodiment, will be represented by the same reference numerals and a description thereof will not be repeated.

In the shown embodiment, a rigid or stiff connecting tube 260 is interposed between the cylinder housing 202 and the accumulator body 234 which is arranged in a parallel relationship to the cylinder housing 202. As seen from FIG. 5, the pressure accumulator assembly 240 is arranged in up-side-down fashion as compared with the former embodiment. The connecting tube 260 defines a communication path 262 for establishing fluid communication between lower fluid chamber 208 and the fluid chamber 242. This embodiment exhibits substantially the same advantages discussed with respect to the former embodiment.

Therefore, the invention fulfills all of the objects and advantages sought therefor.

What is claimed is:

1. A hydraulic cylinder assembly for damping relative displacement of relatively movable first and second members, said hydraulic cylinder assembly comprising:
   a cylinder housing defining an internal space filled with a working fluid and connected to said first member, said internal space connected to a fluid pressure source via a hydraulic circuit;
   a piston disposed within said internal space of said cylinder housing and dividing said internal space into said first and second fluid chambers, said first fluid chamber in fluid communication with said hydraulic circuit, said piston connected to said second member via a piston rod extending from said cylinder housing, and said piston including a first fluid flow path for permitting a limited flow rate of fluid between said first and second fluid chambers;
   a pressure control value means, disposed within said hydraulic circuit, for controlling introduction and draining of pressurized fluid into and from said first fluid chamber in order to adjust damping characteristics;
   a pressure accumulating unit having a body connected to said cylinder housing, said body defining a space in communication with said second fluid chamber via a flow restricting fluid path; and
   a free piston assembly disposed within said space of said body for dividing said space into a third fluid chamber and a pneumatic chamber, said third fluid chamber in communication with said second fluid chamber via said flow restricting fluid path, said free piston assembly movable depending upon a pressure difference between said third fluid chamber and said pneumatic chamber, for receiving pressurized fluid in said third fluid chamber when the fluid pressure in said second fluid chamber is higher than that in said third fluid chamber, for accumulating pressure and supplying pressure to said second fluid chamber when the fluid pressure in said second fluid chamber is lower than that in said third fluid chamber.

2. A hydraulic cylinder as set forth in claim 1, wherein said free piston assembly has a diameter greater than that of said piston in said cylinder housing.

3. A hydraulic cylinder as set forth in claim 1, wherein said piston in said cylinder housing has a flow restrictive communication path for establishing fluid communication between said first and second fluid chambers.

4. A hydraulic cylinder as set forth in claim 3, wherein said communication path includes a flow restricting means for varying flow restriction magnitude depending upon the flow direction of the working fluid.

5. A hydraulic cylinder as set forth in claim 4, wherein said flow restricting means applies greater magnitude of flow restriction for fluid flow from said first fluid chamber to said second fluid chamber than that for fluid flow in an opposite direction.

6. A hydraulic cylinder as set forth in claim 1, wherein said fluid path includes a flow restricting means for varying flow restriction magnitude depending upon the flow direction of the working fluid.

7. A hydraulic cylinder as set forth in claim 6, wherein said flow restricting means applies greater magnitude of flow restriction for fluid flow from said second fluid chamber to said third fluid chamber than that for fluid flow in an opposite direction.

8. A hydraulic cylinder as set forth in claim 5, wherein said fluid path includes a flow restricting means for varying flow restriction magnitude depending upon a flow direction of the working fluid.

9. A hydraulic cylinder as set forth in claim 8, wherein said flow restricting means applies greater magnitude of flow restriction for fluid flow from said second fluid chamber to said third fluid chamber than that for fluid flow in an opposite direction.

10. A hydraulic cylinder assembly for an automotive suspension system for absorbing relative movement between a vehicle body and a suspension member rotatably mounting a vehicular wheel, said hydraulic cylinder assembly comprising:
    a cylinder housing opposed defining an internal space filled with a working fluid and connected to said first member, said internal space connected to a fluid pressure source via a hydraulic circuit;
    a piston disposed within said internal space of said cylinder housing and dividing said internal space into first and second fluid chambers, said first fluid chamber in fluid communication with said hydraulic circuit, said piston connected to said second member via a piston rod extending from said cylinder housing, and said piston including a first fluid flow path for permitting a limited flow rate of fluid between said first and second fluid chambers;
    a pressure control value means, disposed within said hydraulic circuit, for controlling introduction and draining of pressurized fluid into and from said first fluid chamber in order or adjust damping characteristics;
    a pressure accumulating unit having a body connected to said cylinder housing, said body defining a space in communication with said second fluid chamber via a flow restricting fluid path; and
    a free piston assembly disposed within said space of said body for dividing said space into a third fluid chamber and a pneumatic chamber, said third fluid chamber in communication with said second fluid chamber via said flow restricting fluid path, said free piston assembly movable depending upon a pressure difference between said third fluid chamber and said pneumatic chamber, for receiving pressurized fluid in said third fluid chamber when the fluid pressure in said second fluid chamber is higher than that in said third fluid chamber, for accumulating pressure and supplying pressure to said second fluid chamber when the fluid pressure in said second fluid chamber is lower than that in said third fluid chamber.

11. A hydraulic cylinder as set forth in claim 10, wherein said free piston assembly has a diameter greater than that of said piston in said cylinder housing.

12. A hydraulic cylinder as set forth in claim 10, wherein said piston in said cylinder housing has a flow restrictive communication path for establishing fluid communication between said first and second fluid chambers.

13. A hydraulic cylinder as set forth in claim 12, wherein said communication path includes a flow restricting means for varying flow restriction magnitude depending upon flow direction of the working fluid.

14. A hydraulic cylinder as set forth in claim 13, wherein said flow restricting means applies greater magnitude of flow restriction for fluid flow caused by relative motion of vehicle body and suspension member in rebounding direction than fluid flow created by bounding action.

15. A hydraulic cylinder as set forth in claim 10, wherein said fluid path includes a flow restricting means for varying flow restriction magnitude depending upon flow direction of the working fluid.

16. A hydraulic cylinder as set forth in claim 15, wherein said flow restricting means applies greater magnitude of flow restriction for fluid flow caused by relative motion of vehicle body and suspension member in a bounding direction than fluid flow created by rebounding action.

17. A hydraulic cylinder as set forth in claim 14, wherein said fluid path includes a flow restricting means for varying flow restriction magnitude depending upon flow direction of the working fluid.

18. A hydraulic cylinder as set forth in claim 17, wherein said flow restricting means applies greater magnitude of flow restriction for fluid flow caused by relative motion of vehicle body and suspension member in a bounding direction than fluid flow created by rebounding action.

19. An actively controlled suspension system for automotive suspension, said actively controlled suspension system comprising:
a hydraulic cylinder assembly disposed between a vehicle body and a suspension member rotatably supporting a vehicular wheel, said hydraulic cylinder comprising
a cylinder housing defining an internal space filled with a working fluid and connected to said first member, said internal space connected to a fluid pressure source via a hydraulic circuit;
a piston disposed within said internal space of said cylinder housing and dividing said internal space into first and second fluid chambers, said first fluid chamber in fluid communication with said hydraulic circuit, said piston connected to said second member via a piston rod extending from said cylinder housing, and said piston including a first fluid flow path for permitting a limited flow rate of fluid between said first and second fluid chambers;
a pressure accumulating unit having a body connected to said cylinder housing, said body defining a space in communication with said second fluid chamber via a flow restricting fluid path; and
a free piston assembly disposed within said space of said body for dividing said space into a third fluid chamber and a pneumatic chamber, said third fluid chamber in communication with said second fluid chamber via said flow restricting fluid path, said free piston assembly movable depending upon a pressure difference between said third fluid chamber and said pneumatic chamber, for receiving pressurized fluid in said third fluid chamber when the fluid pressure in said second fluid chamber is higher than that in said third fluid chamber, for accumulating pressure and supplying pressure to said second fluid chamber when the fluid pressure in said second fluid chamber is lower than that in said third fluid chamber, and
a hydraulic means, interposed within said hydraulic circuit and associated with said first chamber of said hydraulic cylinder, for adjusting fluid pressure in said first chamber to control attitude of a vehicle so as to suppress attitude changes of said vehicular body, said hydraulic means includes a pressure source and a pressure control valve which is electrically controlled to introduce pressurized working fluid into said first chamber and to drain working fluid from said first chamber depending upon vehicle driving conditions.

20. An actively controlled suspension system as set forth in claim 19, wherein said pressure control valve comprises a valve housing defining a valve bore, an inlet port connected to said pressure source means via a supply line of said hydraulic means, a drain port connected to said pressure source means via a drain line of said hydraulic means and an outlet port connected to said first chamber of said hydraulic cylinder, a valve member disposed within said valve bore for thrusting movement therein for selectively establishing communication between said outlet port and said inlet port and between said outlet port and said drain port for controlling fluid pressure in said first chamber, and an electrically operable actuator associated with said valve member for driving said valve member to control valve position according to vehicle driving conditions.

21. A hydraulic cylinder as set forth in claim 19, wherein said free piston assembly has a diameter greater than that of said piston in said cylinder housing.

22. A hydraulic cylinder as set forth in claim 19, wherein said piston in said cylinder housing has a flow restrictive communication path for establishing fluid communication between said first and second fluid chambers.

23. A hydraulic cylinder as set forth in claim 22, wherein said communication path includes a flow restricting means for varying flow restriction magnitude depending upon the flow direction of the working fluid.

24. A hydraulic cylinder as set forth in claim 23 wherein said fluid path includes a flow restricting means for varying flow restriction magnitude depending upon the flow direction of the working fluid.

25. A hydraulic cylinder as set forth in claim 24, wherein said flow restricting means of said fluid path applies greater magnitude of flow restriction for fluid flow caused by relative motion of said vehicle body and said suspension member in a rebounding direction than fluid flow created by bounding action.

26. A hydraulic cylinder as set forth in claim 25, wherein said flow restricting means applies greater magnitude of flow restriction for fluid flow caused by relative motion of vehicle body and suspension member in a bounding direction than fluid flow created by rebounding action.

27. A hydraulic cylinder assembly for damping relative displacement of relatively movable first and second members, said hydraulic cylinder assembly comprising:
a cylinder housing defining an internal space filled with a working fluid and connected to said first member, said internal space connected to a fluid pressure source via a hydraulic circuit;
a piston disposed within said internal space of said cylinder housing and dividing said internal space into said first and second fluid chambers, said first fluid chamber in fluid communication with said hydraulic circuit, said piston connected to said second member via a piston rod extending from said cylinder housing, and said piston including a first fluid flow path for permitting a limited flow rate of fluid between said first and second fluid chambers and a second fluid flow path for permitting one-way fluid flow from said second fluid chamber to said first fluid chamber;
a pressure control valve means, disposed within said hydraulic circuit, for controlling introduction and draining of pressurized fluid into and from said first fluid chamber in order to adjust damping characteristics;
a pressure accumulating unit having a body connected to said cylinder housing, said body defining a space in communication with said second fluid chamber via a third flow restricting fluid path for permitting a limited flow rate of fluid between said second and third fluid chambers and a fourth fluid path permitting one-way fluid flow from said third fluid chamber to said second fluid chamber; and
a free piston assembly disposed within said space of said body for dividing said space into a third fluid chamber and a pneumatic chamber, said third fluid chamber in communication with said second fluid chamber via said flow restricting fluid path, said free piston assembly movable depending upon a pressure difference between said third fluid chamber and said pneumatic chamber, for receiving pressurized fluid in said third fluid chamber when fluid pressure in said second fluid chamber is higher than that in said third fluid chamber, for accumulating pressure and supplying pressure to said second fluid chamber when fluid pressure in said second fluid chamber is lower than that in said third fluid chamber.

28. A hydraulic cylinder assembly for an automotive suspension system for absorbing relative movement between a vehicle body and a suspension member rotatably mounting a vehicular wheel, said hydraulic cylinder assembly, comprising:
a cylinder housing defining an internal space filled with a working fluid and connected to a first member, said internal space connected to a fluid pressure source via a hydraulic circuit;
a piston disposed within said internal space of said cylinder housing and dividing said internal space into said first and second fluid chambers, said first fluid chamber in fluid communication with said hydraulic circuit, said piston connected to said second member via a piston rod extending from sad cylinder housing, and said piston including a first fluid flow path for permitting a limited flow rate of fluid between said first and second fluid chambers;
a pressure control valve means, disposed within said hydraulic circuit, for controlling introduction and draining of pressurized fluid into and from said fluid chamber in order to adjust damping characteristics;
a pressure accumulating unit having a body connected to said cylinder housing, said body defining a space in communication with said second fluid chamber via a second flow restricting fluid path and a third flow path permitting one-way fluid flow from a third chamber to said second fluid chamber; and
a free piston assembly disposed within said space of said body for dividing said space onto said third fluid chamber and a pneumatic chamber, said third fluid chamber in communication with said second fluid chamber via said flow restricting fluid path, said free piston assembly movable depending upon a pressure difference between said third fluid chamber and said pneumatic chamber, for receiving pressurized fluid in said third fluid chamber when the fluid pressure in said second fluid chamber is higher than that in said third fluid chamber, for accumulating pressure and supplying pressure to said second fluid chamber when the fluid pressure in said second fluid chamber is lower than that in said third fluid chamber.

29. An actively controlled suspension system for automotive suspension, said actively controlled suspension system, comprising:
a hydraulic cylinder assembly disposed between a vehicle body and a suspension member rotatably supporting a vehicular wheel, said hydraulic cylinder comprising:
a cylinder housing defining an internal space filled with a working fluid and connected to said first member, said internal space connected to a fluid pressure source via a hydraulic circuit;
a piston disposed within said internal space of said cylinder housing and dividing said internal space into first and second fluid chambers, said first fluid chamber in fluid communication with said hydraulic circuit, said piston connected to a second member via a piston rod expending from said cylinder housing, and said piston including a first fluid flow path for permitting limited flow rate of fluid between said first and second fluid chambers and a second fluid flow path for permitting one-way fluid flow from said second fluid chamber to said first fluid chamber;
a pressure control valve means, disposed within said hydraulic circuit, for controlling introduction and training of pressurized fluid into and from said first fluid chamber in order to adjust damping characteristics;
a free piston assembly disposed within said space of said body for dividing said space into a third fluid chamber and a pneumatic chamber, said third fluid chamber in communication with said second fluid chamber via said flow restricting fluid path, said free piston assembly movable depending upon a pressure difference between said third fluid chamber and said pneumatic chamber, for receiving pressurized fluid in said third fluid chamber when the fluid pressure in said second fluid chamber is greater than that in said third fluid chamber, for accumulating pressure and supplying pressure to said second fluid chamber when fluid pressure in said second fluid chamber is lower than that in said third fluid chamber; and a hydraulic means, interposed within said hydraulic circuit and associated with said first chamber of said hydraulic cylinder, for adjusting fluid pressure in said first chamber to control attitude of a vehicle so as to suppress attitude change of said vehicle body, said hydraulic means including a pressure source and a pressure control valve which is electrically controlled to introduce pressurized working fluid from said first chamber and to drain working fluid from said first chamber depending upon vehicle driving conditions.

* * * * *